US010351066B2

(12) United States Patent
Munro et al.

(10) Patent No.: US 10,351,066 B2
(45) Date of Patent: Jul. 16, 2019

(54) ASSEMBLY CAPABLE OF DEPLOYING STOWED ITEMS IN A PASSENGER COMPARTMENT OF A VEHICLE

(71) Applicant: Global IP Holdings LLC, Sterling Heights, MI (US)

(72) Inventors: Scott Munro, Clarkston, MI (US); Richard D. Adamson, Sr., Almont, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 51 days.

(21) Appl. No.: 15/803,924

(22) Filed: Nov. 6, 2017

(65) Prior Publication Data
US 2019/0135187 A1    May 9, 2019

(51) Int. Cl.
*B60R 13/00* (2006.01)
*B60R 7/04* (2006.01)
*B60N 3/10* (2006.01)

(52) U.S. Cl.
CPC ............ *B60R 7/04* (2013.01); *B60N 3/104* (2013.01)

(58) Field of Classification Search
CPC .................... B60R 7/04; B60N 3/104
See application file for complete search history.

(56) References Cited

U.S. PATENT DOCUMENTS

| 4,453,759 A * | 6/1984 | Kathiria | B60N 2/793 296/37.8 |
|---|---|---|---|
| 5,020,845 A | 6/1991 | Falcoff et al. | |
| 7,234,746 B2 | 6/2007 | Sakakibara et al. | |
| 8,528,956 B1 * | 9/2013 | Winiger | B60R 7/04 296/24.34 |
| 2004/0135391 A1 * | 7/2004 | Gehring | B60N 3/102 296/37.12 |
| 2005/0206182 A1 | 9/2005 | DePue et al. | |
| 2006/0186686 A1 | 8/2006 | Schmidt et al. | |
| 2009/0224564 A1 * | 9/2009 | O'Brien | B60N 3/102 296/37.8 |
| 2010/0025142 A1 | 2/2010 | Staib | |
| 2011/0068598 A1 * | 3/2011 | Penner | B60R 7/04 296/37.8 |
| 2015/0145393 A1 * | 5/2015 | Young | A47B 46/005 312/246 |
| 2017/0232607 A1 * | 8/2017 | Michael | A47B 88/42 312/107 |
| 2018/0162299 A1 * | 6/2018 | Ranganathan | B60N 2/0232 |

* cited by examiner

Primary Examiner — Lori L Lyjak
(74) Attorney, Agent, or Firm — Brooks Kushman P.C.

(57) ABSTRACT

An assembly capable of deploying stowed items in a passenger compartment of a vehicle is provided. The assembly includes a door and a storage unit having an opening for allowing ingress and egress of items into and out of a storage compartment of the unit, respectively, in an open position of the door. A support member supported within the storage compartment is configured to movably hold an item in the storage compartment and is configured to allow the item to be readily removed from the unit in an extended position of the support member. An actuator is configured to controllably move the support member away from its retracted position towards its extended position through stored potential energy without consuming electrical energy. The door moves towards its open position during movement of support member towards its extended position.

20 Claims, 5 Drawing Sheets

ASSEMBLY CAPABLE OF DEPLOYING STOWED ITEMS IN A PASSENGER COMPARTMENT OF A VEHICLE

TECHNICAL FIELD

At least one embodiment of the invention generally relates to assemblies, such as console assemblies, capable of deploying stowed items in a passenger compartment of a vehicle.

OVERVIEW

As described in U.S. Pat. No. 5,020,845, as automotive design and technology evolve, more and more electronic accessories such as audio systems, computers, and the like find their way into modern automobile instrument panels. Accommodation of such accessories in the instrument panels leaves little room for extra storage therein. Today's sophisticated automobile purchaser demands interior storage which often times cannot be fulfilled by the traditional instrument panel glove compartment. Thus, modern automobile interiors employ many diverse storage compartments such as bins and trays in such areas as the instrument panel, interior door panels, and center console located between the driver and passenger seats.

As described in U.S. Pat. No. 7,234,746, conventionally, storage boxes such as console boxes include a box main body having an opening and a lid for selectively opening and closing the opening. In some of such storage boxes, opening and closing the box main body with a lid are realized by sliding motion and rotation of the lid. In these storage boxes, opening and closing of the lid is performed manually. Also, some storage boxes are equipped with an electrical driving source such as a motor to open and close the lid.

As described in published U.S. patent application No. 2006/0186686, for movable panels which are relatively heavy, it is especially challenging to control the movement of the panels between the open and closed positions. It is desirable that the panels move relatively quickly, but should not slam down with great force or bounce when the panels have reached their outer positions. It is also desirable that only a small force be required to move the panels between the open and closed positions. However, the weight of a relatively heavy panel hinders such a design. It is also desirable that the speed at which the panel is moving from the closed position to the open position is relatively steady.

As described in published U.S. patent application No. 2010/0025142, it is known in the automotive industry to provide vehicles with a gear damper. Gear dampers are often used in automotive interior applications to control the moving speed of components such as pocket lids, trays and glove boxes. Typically, a gear damper includes a main housing, a damper paddle, damper fluid, and a gear that is attached to the component. The main housing has a cavity into which the damper fluid is sealed. The damper paddle is connected to the gear at one end and the opposite end extends into the damper fluid within the housing cavity. As the gear and damper paddle are rotated, the damper paddle must move through the damper fluid. The viscosity of the damper fluid limits the movement of the damper paddle and thus controls the rotational speed of the gear and the component.

While known gear dampers generally work well for their intended purpose, they have limitations. One limitation is related to the fact that governmental regulations require that interior components, such as compartment lids and doors remained closed during a relatively high gravity force (G-force) crash situation. Achieving both the moving speed control of the component and also the regulation requirement is difficult. Typically, a secondary device, such as G-force sensor lock, is required to keep the component from moving or opening during a crash situation. G-force sensor locks are generally large compared to available space and require considerable time to tune and test for proper function.

As described in published U.S. patent application No. 2005/0206182, it is often desirable to provide a locking mechanism for restraining a door to an interior compartment, for example, restraining a glove box door to an instrument panel. To release the glove box door from the instrument panel, a handle is provided on the door that allows the user to disengage the locking mechanism. The handle and locking mechanism occupy space within the glove box and may reduce the storage space available within the glove box and may reduce the storage space available within the glove box or increase the size of the glove box assembly. Typically, automobiles include center consoles that have rear facing portions that allow passengers of the rear portion of the passenger cabin to access various utility features disposed within the center console. Such utility features can include electrical receptacles, heating, ventilation and air conditioning controls, accessory bins, and other various features.

The term "vehicle", as used herein, includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The term "vehicle console" and variations thereof, as used herein, generally refers to, in an automobile, the control bearing surfaces in the center of the front of the vehicle interior. The term is applied to the area beginning in the dashboard and continuing beneath it, and often merging with the transmission tunnel which runs between the front driver's and passenger's seats of many vehicles.

The term "gesture", as used herein, refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

SUMMARY OF EXAMPLE EMBODIMENTS

An object of at least one embodiment of the present application is to provide a cost-effective assembly, such as a console assembly, for a vehicle, wherein the assembly includes a self-opening door and a self-opening storage drawer which move in such a way that they give the illusion that the assembly is motorized and provides easy access to stowed items in a storage unit of the assembly.

In carrying out the above object and other objects of at least one embodiment of the present invention, an assembly capable of deploying stowed items in a passenger compartment of a vehicle includes a door having open and closed positions and a storage unit having an opening for allowing ingress and egress of items into and out of a storage compartment of the unit, respectively, in the open position of the door. A support member is supported within the storage compartment of the unit for movement between extended and retracted positions. The support member is configured to movably hold an item in the storage compartment and is configured to allow the item to be readily removed from the unit in the extended position by a passenger of the vehicle. An actuator is configured to controllably move the support member away from the retracted position towards the extended position through stored potential energy without consuming electrical energy. The door moves towards the open position of the door during movement of support member towards the extended position.

The actuator may include a biasing mechanism configured to apply an amount of mechanical kinetic energy converted from an amount of the stored potential energy to the support member in such a way that application of the amount of mechanical kinetic energy to the support member urges movement of the support member away from the retracted position towards the extended position.

The biasing mechanism comprises may include a constant force or extension spring.

The assembly may further include a dampening device configured to dampen movement of the support member from the retracted position towards the extended position without consuming electrical energy.

The dampening device may include a gear damper.

The assembly may further include a simple-to-operate, gesture-actuated latching device having locked and unlocked states for locking and unlocking the door, respectively. The latching device may prevent movement of the door in the locked state and allow the door to move towards the open position in the unlocked state.

The door may be hingedly attached to the support member.

The support member may comprise a storage drawer or tray.

The assembly may further include a pair of spaced slides to slideable support the support member during movement of the support member between the extended and retracted positions of the support member.

The storage compartment may comprise a thermally-insulated compartment.

Further in carrying out the above object and other objects of at least one embodiment of the present invention, a console assembly capable of deploying stowed items in a passenger compartment of a vehicle is provided. The assembly includes a door having open and closed position and a storage unit having an opening for allowing ingress and egress of items into and out of a storage compartment of the unit, respectively, in the open position of the door. A support member is supported within the storage compartment of the unit for movement between extended and retracted positions. The support member is configured to movably hold an item in the storage compartment and is configured to allow the item to be readily removed from the unit in the extended position by a passenger of the vehicle. An actuator is configured to controllably move the support member away from the retracted position towards the extended position through stored potential energy without consuming electrical energy. The door moves towards the open position of the door during movement of support member towards the extended position.

The actuator may include a biasing mechanism configured to apply an amount of mechanical kinetic energy converted from an amount of the stored potential energy to the support member in such a way that application of the amount of mechanical kinetic energy to the support member urges movement of the support member away from the retracted position towards the extended position.

The biasing mechanism may include a constant force or extension spring.

The assembly may further include a dampening device configured to dampen movement of the support member from the retracted position towards the extended position without consuming electrical energy.

The dampening device may include a gear damper.

The assembly may further include a simple-to-operate, gesture-actuated latching device having locked and unlocked states for locking and unlocking the door, respectively. The latching device may prevent movement of the door in the locked state and allows the door to move towards the open position in the unlocked state.

The door may be hingedly attached to the support member.

The support member comprises a storage drawer or tray.

The assembly may further include a pair of spaced slides to slideable support the support member during movement of the support member between the extended and retracted positions of the support member.

The storage compartment may comprise a thermally-insulated compartment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

Figure 1:
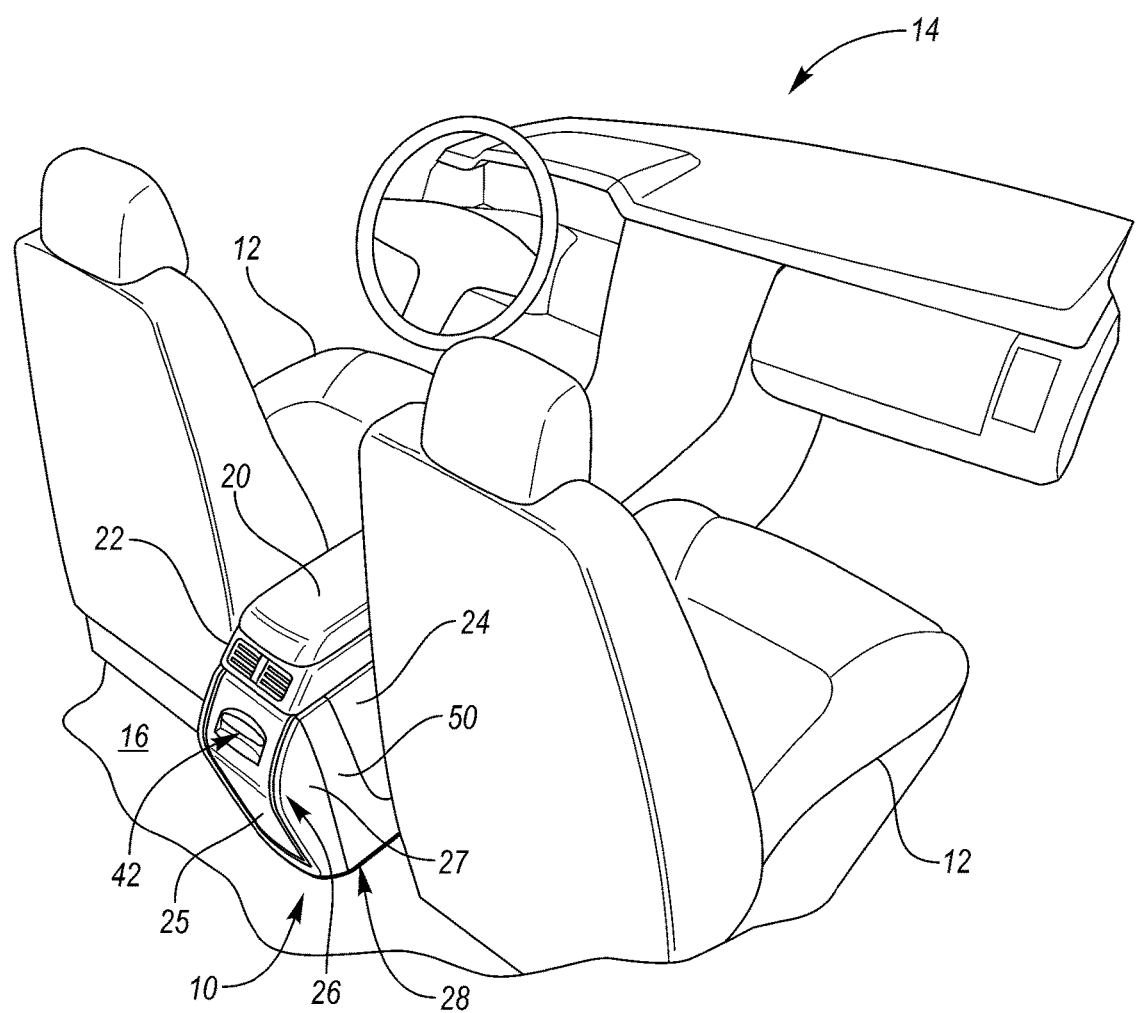
FIG. 1 is an environmental view, partially broken away, of an assembly, such as a console assembly, capable of deploying stowed items in a passenger compartment of a vehicle.
Figure 2:
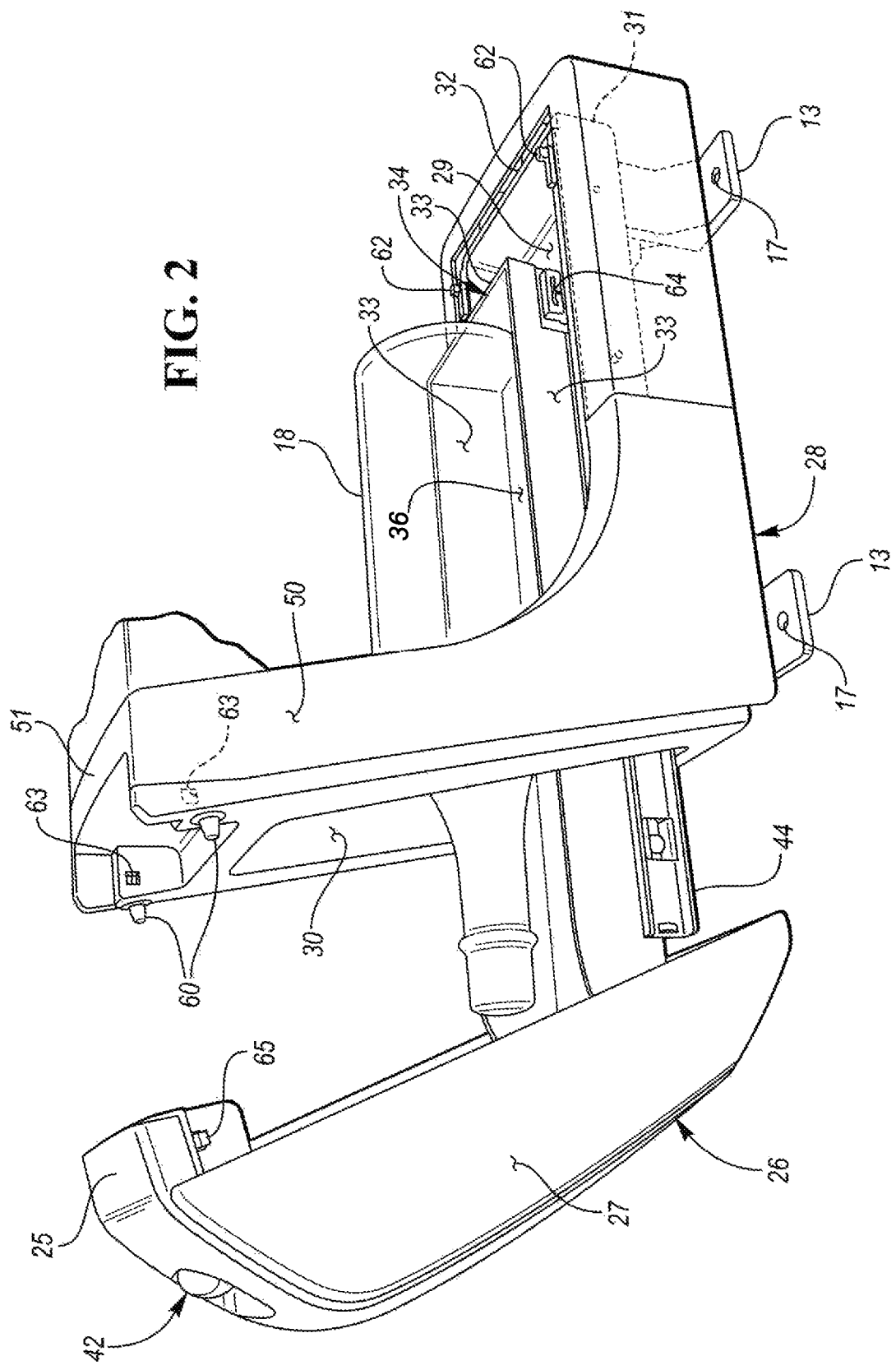
FIG. 2 is a side perspective, schematic view of the assembly with a door of the assembly in a partially open position and a support member or tray of the assembly in its partially extended position.
Figure 4:
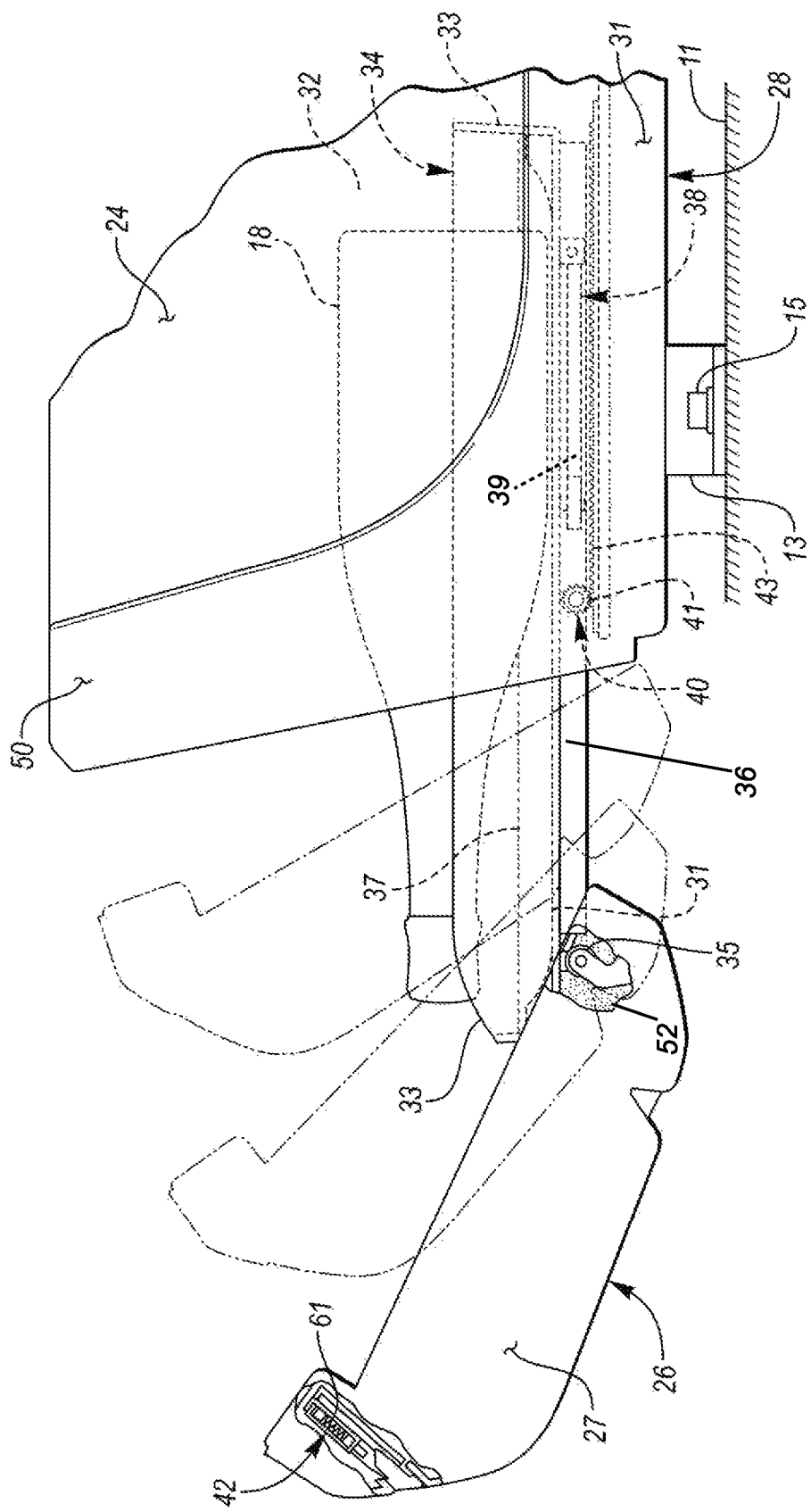
FIG. 4 is a side schematic view, partially broken away, with the assembly mounted on a vehicle panel or frame member and with the door shown in various positions by phantom lines as the door moves between its fully open and its fully closed positions.

Referring now to FIG. 1, there is illustrated an assembly, such as a console assembly, generally indicated at 10, capable of deploying items stowed between a pair of seats 12 in a passenger compartment 16 of a vehicle 14. The items may include a bottle 18 (FIGS. 2 and 4) of a liquid. The console assembly 10 may include a movable arm rest 20, a heating/cooling subassembly 22 and side panels 24 (only one of which is shown).

The assembly 10 includes an insulating door, generally indicated at 26, having open and closed positions and a storage unit, generally indicated at 28, having an opening 30 for allowing ingress and egress of items into and out of a storage compartment 32 of the unit 28, respectively, in the open position of the door 26. The storage compartment 32 may be refrigerated via the subassembly 22.

Figure 3:
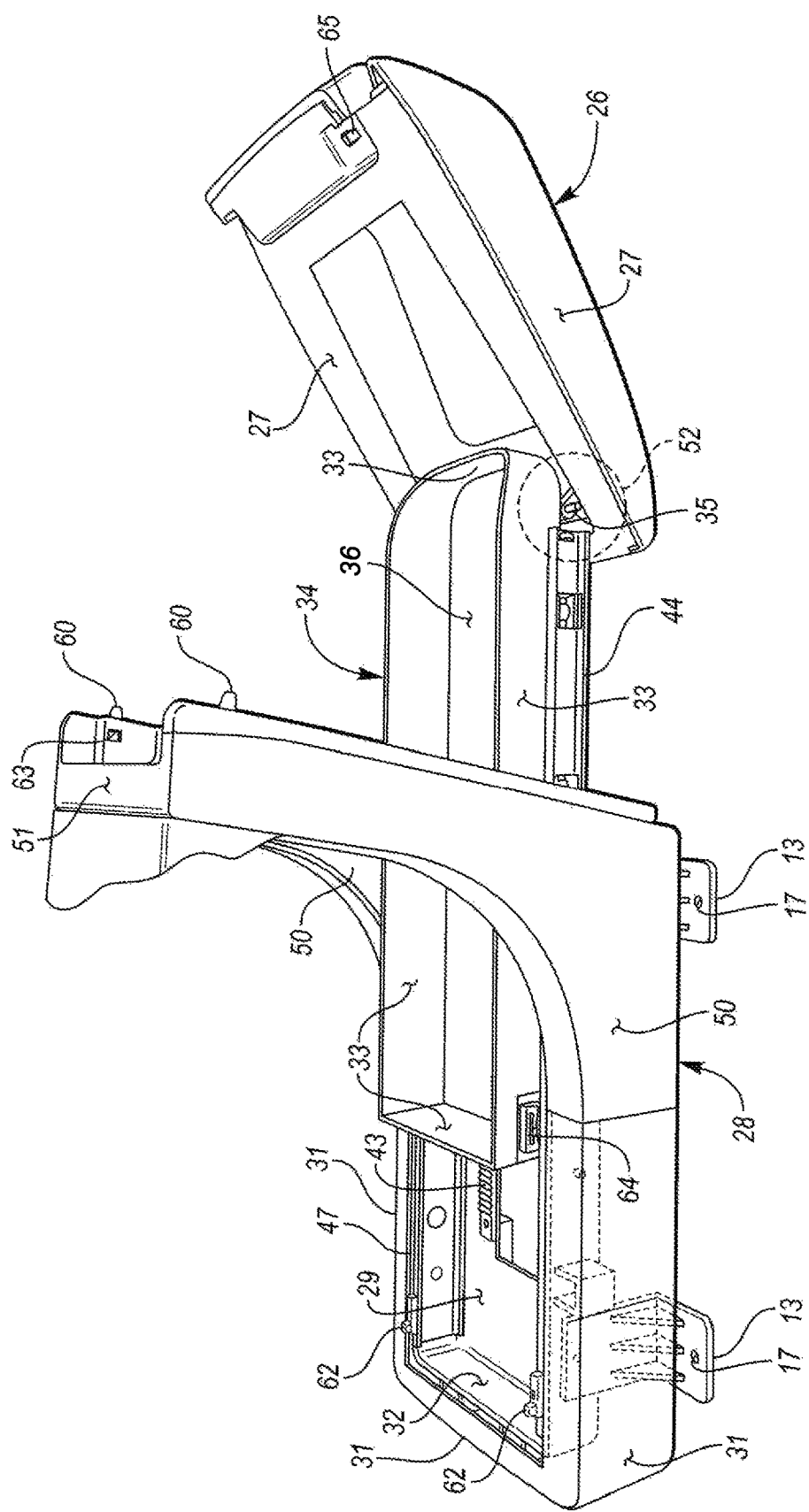
FIG. 3 is a perspective, schematic view from the opposite side of the assembly with the door fully open and the tray fully extended.

The storage unit 28 is preferably mounted on a panel or frame member 11 (FIG. 4) of the vehicle 14 by mounting brackets 13 (FIGS. 3 and 4) and bolts 15 which extend through holes 17 formed through the brackets 13 and into the member 11. The door 26 includes a front panel 25 and side panels 27. The storage unit 28 has an insulating bottom panel 29 and insulating side panels 31.

A support member or tray, generally indicated at 34, is slideably supported within the storage compartment 32 of the unit 28 for movement between extended and retracted positions. The support member 34 is configured to movably hold an item in the storage compartment 32 and is configured to allow the item to be removed from the unit 28 in its extended position by a passenger of the vehicle 14. The door 26 is spring loaded and hingedly attached to the support member 34 by a hinge subassembly 35 (FIG. 4) contained within area 52 in FIG. 4.

The tray 34 typically has a bottom panel 36 and side panels 33 to form the tray 34. An insert 37 which is formed in the shape of the side surface of the bottle 18 may be snuggly fit into the tray 34 to prevent the bottle 18 from rolling during movement of the tray 34.

An actuator, generally indicated at 38, is configured to controllably move the support member 34 away from its retracted position towards its extended position via stored potential energy. The door 26 moves towards its open position during movement of the support member 34 towards its extended position.

The actuator 38 may be attached as its opposite ends to the top surface of the bottom panel 29 and the bottom surface of the bottom panel 36 of the tray 34. The actuator 38 may include a biasing mechanism configured to apply an amount of mechanical kinetic energy converted from an amount of the stored potential energy to the support member 34 in such a way that application of the amount of mechanical kinetic energy to the support member 34 urges movement of the support member 34 away from its retracted position towards its extended position. The biasing mechanism may comprise a constant force or extension spring 39.

The assembly 10 may further include a dampening device, generally indicated at 40, configured to dampen movement of the support member 34 from its retracted position towards its extended position without consuming electrical energy. The dampening device 40 may include a conventional gear damper including a gear 41 pivotally connected to the tray 34 at its lower surface and which rotates on a toothed track 43 which is secured on a top surface of the bottom panel 29 of the storage unit 28.

The assembly 10 may further include a simple-to-operate, gesture-actuated, latching device, generally indicated at 42, having locked and unlocked states for locking and unlocking the door 26, respectively, to upwardly extending insulating side panels 50 of the unit 28. The unit 28 also includes an insulating top panel 51 which interconnects the side panels 50. The latching device 42 prevents movement of the door 26 away from the panels 50 in the locked state and allows the door 26 to move towards its open position in the unlocked state by means of the actuator 38.

The latching device 42 may include a latch coupler or spring-loaded plunger 61 actuated by a button and supported on the door 26 and apertures 63 in the side panels 50 which receive latching members 65 or dual pawls which are actuated by the plunger 61 upon manual actuation of the device 42 by a passenger of the vehicle 14.

The assembly 10 may further include a pair of elongated spaced slides 44 fixed to the outer surfaces of side panels 33 of the tray 34 to slideable support the tray 34 during movement of the tray 34 between its extended and retracted positions. The slides 44 slide or ride on rails 47 secured to the inner surfaces of the side panels 31 of the unit 28.

Resilient spring bumpers 60 located on the side panels 50 bias the door 26 towards its open position. Upon actuation of the latching device 42 by a passenger of the vehicle 14, the bumpers 60 push the door 26 a predetermined amount, such as approximately 5 degrees. Thereafter, the biasing mechanism or constant force spring moves the tray 34 towards its extended position and the door 26 to its open position.

Retention or bumper stops 62 positioned on top surfaces of the rails 47 engage and hold members 64 positioned on the outer surface of the side panels 33 to hold and locate the tray 34 with respect to the unit 28 in its retracted position.

Figure 5A:
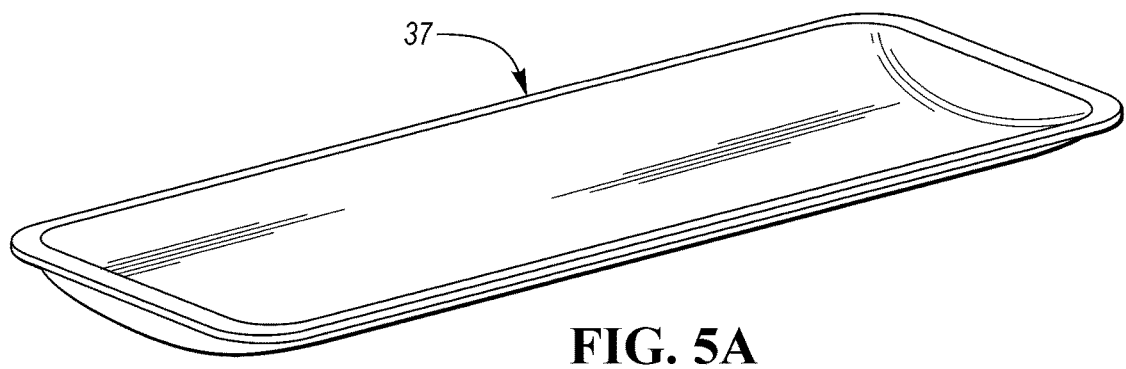
FIGS. 5a and 5b are top and bottom perspective, schematic views, respectively, of an insert that can be placed in the tray to limit rolling movement of a bottle placed in the tray.
Figure 5B:
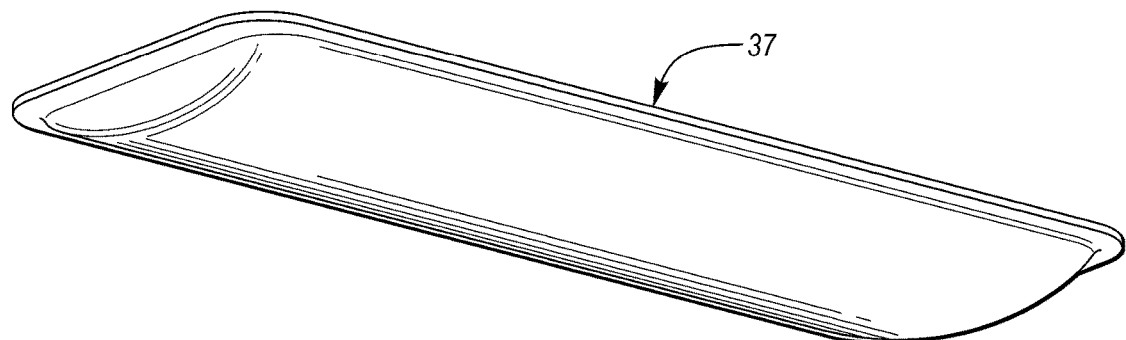

FIGS. 5a and 5b are top and bottom, perspective, schematic views, respectively, of the insert 37 which can be placed in the tray 34 to limit rolling movement of the bottle 18 during vehicle movement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An assembly capable of deploying stowed items in a passenger compartment of a vehicle, the assembly comprising:

a door having open and closed positions;

a storage unit having an opening for allowing ingress and egress of items into and out of a storage compartment of the unit, respectively, in the open position of the door;

a support member supported within the storage compartment of the unit for movement between extended and retracted positions, the support member being configured to movably hold an item in the storage compartment and being configured to allow the item to be removed from the storage unit in the extended position by a passenger of the vehicle; and an actuator configured to controllably move the support member away from the retracted position towards the extended position through stored potential energy without consuming electrical energy wherein the door moves towards the open position of the door during movement of support member towards the extended position.

2. The assembly as claimed in claim 1 wherein the actuator includes a biasing mechanism configured to apply an amount of mechanical kinetic energy converted from an amount of the stored potential energy to the support member in such a way that application of the amount of mechanical kinetic energy to the support member urges movement of the support member away from the retracted position towards the extended position.

3. The assembly as claimed in claim 2, wherein the biasing mechanism comprises a constant force or extension spring.

4. The assembly as claimed in claim 1 further comprising a dampening device configured to dampen movement of the support member from the retracted position towards the extended position without consuming electrical energy.

5. The assembly as claimed in claim 4 wherein the dampening device includes a gear damper.

6. The assembly as claimed in claim 1 further comprising a simple-to-operate, gesture-actuated, latching device having locked and unlocked states for locking and unlocking the door, respectively, the latching device preventing movement of the door in the locked state and allowing the door to move towards the open position in the unlocked state.

7. The assembly as claimed in claim 1 wherein the door is hingedly attached to the support member.

8. The assembly as claimed in claim 1 wherein the support member comprises a storage drawer or tray.

9. The assembly as claimed in claim 1 further comprising a pair of spaced slides to slideable support the support member during movement of the support member between the extended and retracted positions of the support member.

10. The assembly as claimed in claim 1 wherein the storage compartment comprises a thermally-insulated compartment.

11. A console assembly capable of deploying stowed items in a passenger compartment of a vehicle, the assembly comprising:
   a door having open and closed positions;
   a storage unit having an opening for allowing ingress and egress of items into and out of a storage compartment of the unit, respectively, in the open position of the door;
   a support member supported within the storage compartment of the unit for movement between extended and retracted positions, the support member being configured to movably hold an item in the storage compartment and being configured to allow the item to be removed from the unit in the extended position by a passenger of the vehicle; and
   an actuator configured to controllably move the support member away from the retracted position towards the extended position through stored potential energy without consuming electrical energy wherein the door moves towards the open position of the door during movement of support member towards the extended position.

12. The assembly as claimed in claim 11 wherein the actuator includes a biasing mechanism configured to apply an amount of mechanical kinetic energy converted from an amount of the stored potential energy to the support member in such a way that application of the amount of mechanical kinetic energy to the support member urges movement of the support member away from the retracted position towards the extended position.

13. The assembly as claimed in claim 12, wherein the biasing mechanism comprises a constant force or extension spring.

14. The assembly as claimed in claim 11 further comprising a dampening device configured to dampen movement of the support member from the retracted position towards the extended position without consuming electrical energy.

15. The assembly as claimed in claim 14 wherein the dampening device includes a gear damper.

16. The assembly as claimed in claim 11 further comprising a simple-to-operate, gesture-actuated, latching device having locked and unlocked states for locking and unlocking the door, respectively, the latching device preventing movement of the door in the locked state and allowing the door to move towards the open position in the unlocked state.

17. The assembly as claimed in claim 11 wherein the door is hingedly attached to the support member.

18. The assembly as claimed in claim 11 wherein the support member comprises a storage drawer or tray.

19. The assembly as claimed in claim 11 further comprising a pair of spaced slides to slideable support the support member during movement of the support member between the extended and retracted positions of the support member.

20. The assembly as claimed in claim 11 wherein the storage compartment comprises a thermally-insulated compartment.

* * * * *

UNITED STATES PATENT AND TRADEMARK OFFICE
CERTIFICATE OF CORRECTION

PATENT NO. : 10,351,066 B2  
APPLICATION NO. : 15/803924  
DATED : July 16, 2019  
INVENTOR(S) : Scott Munro et al.

Page 1 of 1

It is certified that error appears in the above-identified patent and that said Letters Patent is hereby corrected as shown below:

In the Claims

Column 7, Line 24, Claim 9:  
After "a pair of spaced slides to"  
Delete "slidable" and  
Insert -- slidably --.

Column 8, Line 37, Claim 19:  
After "a pair of spaced slides to"  
Delete "slidable" and  
Insert -- slidably --.

Signed and Sealed this  
Tenth Day of December, 2019

Andrei Iancu  
*Director of the United States Patent and Trademark Office*